July 14, 1964  E. KOZAK ETAL  3,140,671
CARGO TIE-DOWN APPARATUS
Filed Oct. 23, 1961  2 Sheets-Sheet 1
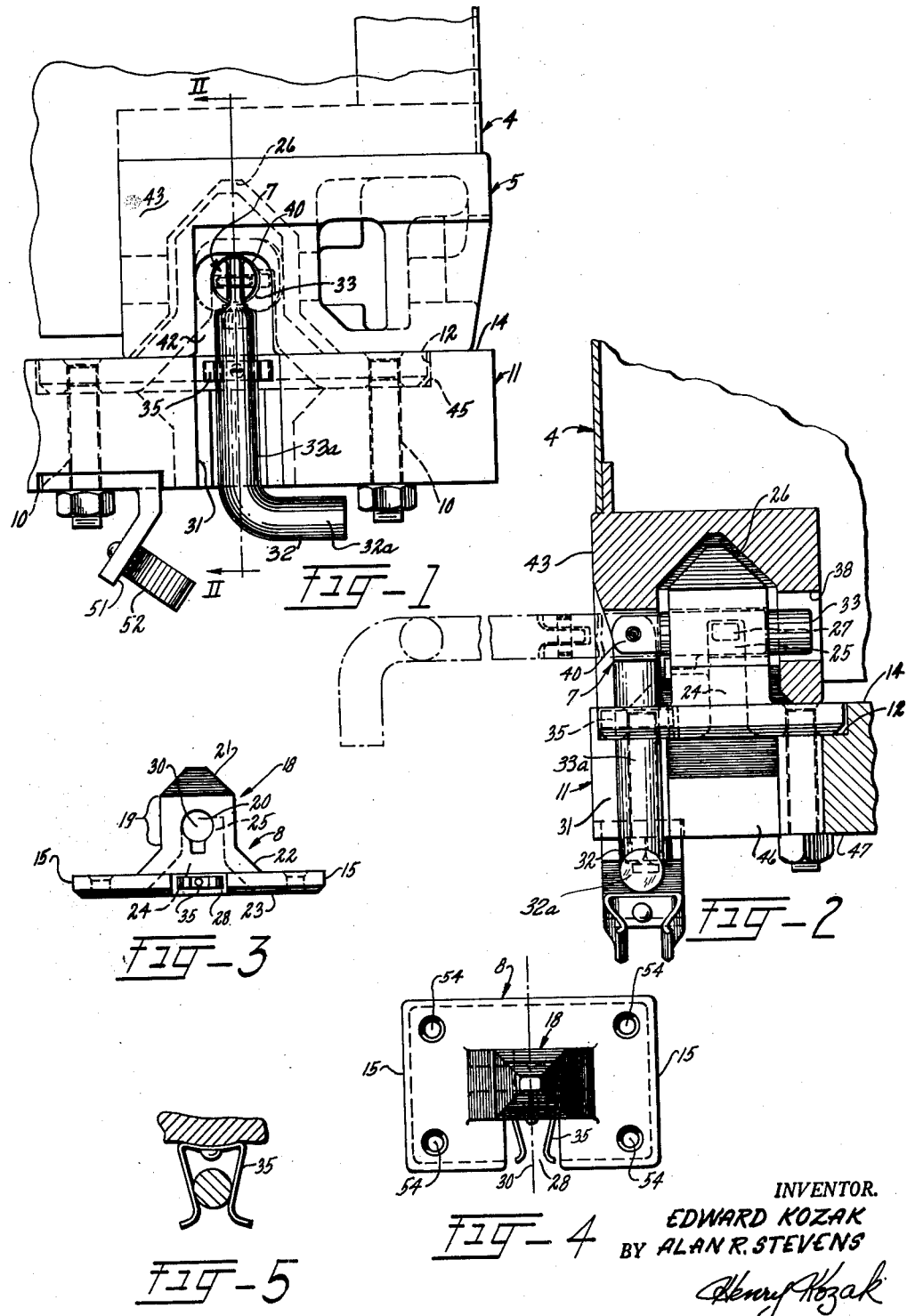
INVENTOR.
EDWARD KOZAK
BY ALAN R. STEVENS
Henry Kozak
ATTORNEY July 14, 1964 E. KOZAK ETAL 3,140,671
CARGO TIE-DOWN APPARATUS
Filed Oct. 23, 1961 2 Sheets-Sheet 2
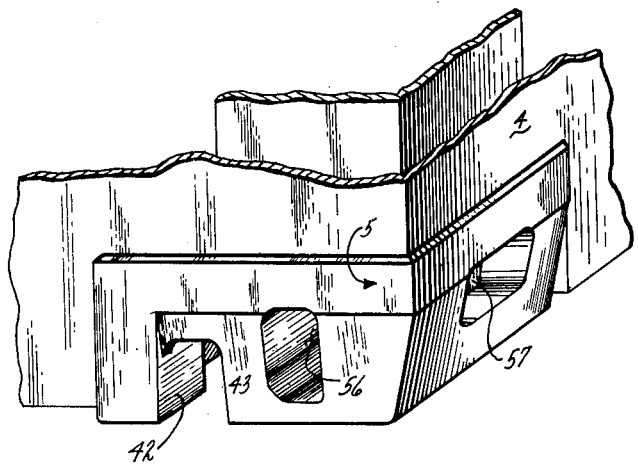
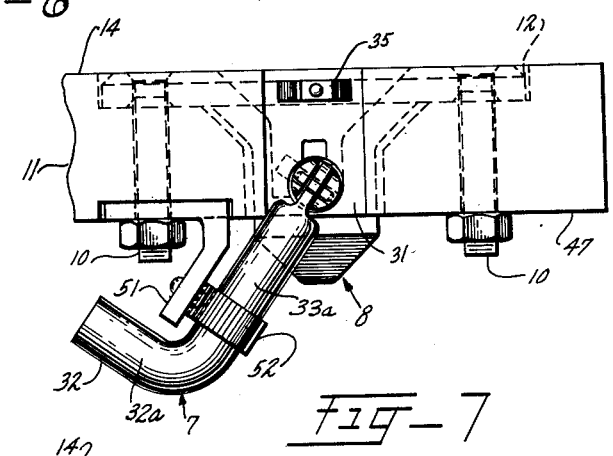
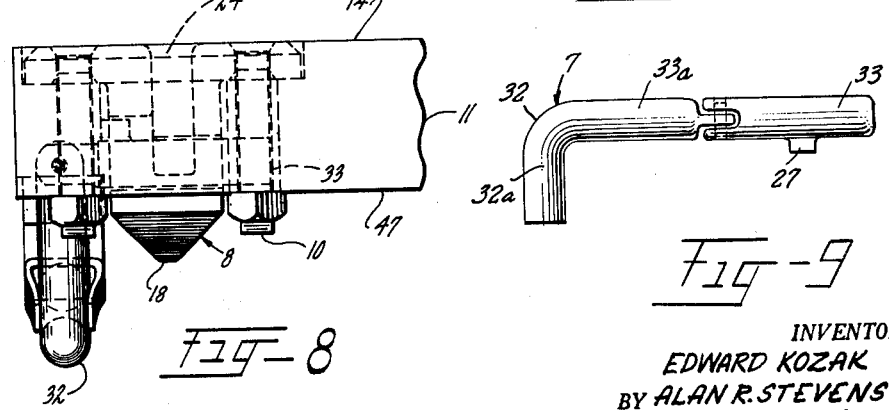
INVENTOR.
EDWARD KOZAK
BY ALAN R. STEVENS
ATTORNEY United States Patent Office
3,140,671
Patented July 14, 1964

3,140,671
CARGO TIE-DOWN APPARATUS
Edward Kozak and Alan R. Stevens, Cleveland, Ohio, assignors to National Castings Company, Cleveland, Ohio, a corporation of Ohio
Filed Oct. 23, 1961, Ser. No. 146,731
7 Claims. (Cl. 105—366)

The present invention relates to a tie-down apparatus of particular utility in securing cargo containers or pallets and the like to the platforms or floors of railway cars, highway trucks, and airplanes.

Rail or highway vehicles especially adapted for cargo container carriage are generally constructed with a flat bed having no sideboards or other vertical protrusions from its periphery. However, in commercial cartage operations, good safety practice requires that the container be locked to the carrier to prevent shifting, tipping, or other separation. Prevention of load shifting also assures that the load distribution on the vehicle will remain as intended.

Hence, it is an important object to provide apparatus for anchoring a cargo container to a carrier wherein connection of the carrier is made to the container within the bottom periphery of the container.

A further object is to provide apparatus comprising corner portions of a cargo container and fixtures attachable to a carrier and arranged and constructed to project above the carrier into the corner portions and to be locked therewith.

Another object is to provide the foregoing apparatus in such form that, when the carrier is loaded with the container, all parts thereof fit within the lateral contour of the container and the carrier.

A further object is to provide a carrier platform and an anchor or tie-down fixture permitting inversion of the fixture to non-protruding relation with the container-receiving surface of the carrier.

Still another object is to provide an anchor fixture that has good drainage and is self-cleaning.

An object ancillary to all of the foregoing objects is to provide tie-down apparatus utilizing a key which may be secured in its position for interlocking the cargo article and the anchor member.

To accomplish these and other objects, the present invention comprises in brief tie-down apparatus for a cargo container or other cargo unit having an anchor member adapted to be secured to the platform of a vehicle or other support, and a corner member for the cargo unit having a recess extending upwardly therewithin from its undersurface adapted to receive a stud of the anchor member projecting upwardly from the upper surface of the support or carrier. The anchor member also has a base above which the stud projects and the keyway extending through the stud along a generally horizontal axis spaced above the base and preferably eccentrically enlarged to define a radially offset region along an intermediate portion of its length. It further defines a groove extending lengthwise of the keyway from the offset region to one terminus of the keyway at one side of the stud. The angular extent of the groove about the axis of the keyway substantially is less than that of the region.

The tie-down apparatus further comprises a key having a handle comprising a shank portion and a grip extending radially outwardly from one end thereof, and a pin of shaft-like material connected to the shank in end-to-end pivotal relation at a folding axis perpendicular to the length of the pin. The pin has a laterally projecting lug traversable through the groove of the stud. When positioned with the lug in the offset region, the end portion of the pin protrudes beyond the side opposite the side in which the groove terminates.

The key is movable lengthwise of the keyway to traverse the lug through the groove to retract the protruding pin portion within the stud. The length of the pin enables the handle to be folded into a vertical plane adjacent one side of the stud when the pin is positioned with the lug in the offset region. Thus, the stud and the pin comprise detent means limiting endwise movement of the pin when the handle is folded downwardly.

In a preferred embodiment of the invention, the carrier is recessed to receive the base in flush or depressed relation with its upper surface. This condition, along with a suitable stud-receiving aperture in the carrier and suitable upper and lower bearing surfaces on the base for mating with complementary bearing surfaces in the recess of the carrier provide invertibility of the anchor member whereby the carrier cargo-receiving surface is placed in a condition free of upward projections.

In the drawing with respect to which the invention is described:

FIG. 1 is a fragmentary elevation of a corner portion of a cargo container secured to a carrier including an anchor member attached to the carrier and a lower corner member of the container into which the anchor member extends.

FIG. 2 is an elevation in section along line II–II of FIG. 1 with the anchor member not in section.

FIG. 3 is an elevation of the anchor member included in FIGS. 1 and 2 as viewed along the axis of its keyway.

FIG. 4 is a plan view of the member of FIG. 3.

FIG. 5 is a fragmentary section of the anchor member of FIGS. 3 and 4 illustrating the spring clamp carried thereon for receiving the key handle shown.

FIG. 6 is a fragmentary perspective of the lower corner container portion shown in FIG. 1.

FIG. 7 is a fragmentary elevation of the carrier portion shown in FIGS. 1 and 2 with the anchor member in inverted relationship with the carrier.

FIG. 8 is an elevation taken at right angles with the view shown in FIG. 7.

FIG. 9 is a side view of the key with the handle and pin shown in a non-pivotal relationship.

FIGS. 1 and 2 illustrate a preferred embodiment of the invention wherein one of four corners of a cargo container comprises a lower corner member or casting 5, normally welded to the skin and frame of the container, and is interlocked by a key 7 to an anchor member or fixture 8. This fixture is bolted (see bolts 10) to the platform 11 of a carrier.

The platform 11 has a recess 12 having a depth, as measured from the upward-facing surface 14 of the carrier, approximately equal to the vertical thickness of the flange 15 in the base of the anchor member. Such equal depth and thickness enables the flange and the platform together to present maximum bearing area to the undersurface of the corner members 5 of the container. As shown, the corner members protrude slightly below the floor of the container and thus transmit the entire container load to the carrier surfaces underlying the members 5.

FIGS. 3, 4, and 5 illustrate the anchor member or fixture 8 apart from the other portions of the tie-down apparatus. The fixture 8, in addition to the aforementioned base flange 15, comprises a stud 18 having a vertical middle portion 19 defining a passageway or keyway 20, an upwardly tapered terminal portion 21, and a lower portion 22 flaring outwardly and downwardly from the intermediate portion 19. As shown, the lower portion of the stud 18 flares outwardly along merely those sides thereof extending parallel to the keyway 20.

Apparent from FIGS. 2, 3, and 4 is a recess 24 in fixture 8 which extends from the bottom surface 23 of the member upwardly to merge with and include a portion of the keyway 20. According to the view taken, either the recess 24 or the keyway 20 comprises a region 25 eccentric with respect to an axis 30 of the keyway 20 within which a lug 27 is rotatable within the stud through an angle of approximately 90 degrees about the axis.

Where invertibility of the stud with respect to the platform is desired, it is preferable that the recess 24 extends no higher within the stud than shown in FIG. 3 in order to maintain proper drainage of the entire opening of the fixture 8 including the keyway 20 and the recess 24. The stud 18 is received into a recess 26 of the member 5 when the container is placed on the platform 11. It is, of course, obvious that the fixture 8 will be self-draining and self-cleaning with the stud oriented upwardly as shown in FIG. 3 and the platform provided with an opening 46.

In the embodiment shown, the stud is centered generally within the flange or base 15 with respect to a horizontal plane. The flange extends entirely around the stud 18 except for a slot 28 therein extending inwardly from the outer periphery of the flange and approximately centered with respect to a vertical plane containing the axis 30 of the keyway 20. The slot 28 of fixture 8 and a slot 31 of the platform extends into more or less vertically flush relation with the adjacent side of the stud 18 to permit fold-down of a handle 32 relative to the pin 33 of the key 7. Each of these slots provide an abutment for limiting angular movement of the handle about the horizontal axis of the pin. The slot 31 is contiguous with the opening 46 and in vertical alignment or registry with the flange slot 28. At the bottom or horizontal extremity of the slot 28, a spring clamp 35 is secured to the base into which a grip 32a of the handle 32 is received, as shown in FIG. 2.

To obtain the tie-down position of the container 4 relative to the platform 11, illustrated in FIGS. 1 and 2, the length of the pin 33 is such as to project outwardly from the stud 18 and allow extension of a portion into an aperture 38 of the corner member 5 with the lug 27 disposed within the eccentric region 25 of the keyway. The other bifurcate end portion 40 of the pin projects into another aperture or slot 42 of the member 5 but preferably not beyond its outer surface to permit folding-down of a shank portion 33a of the handle 32 relative thereto within concealed or flush relation with the outer surface 43 of the container member 5. Thus the shank is disposed between the pin 33 and the grip 32a to space the grip at a predetermined distance from the keyway 20 of the stud 18 to provide for ease of manipulation. The aperture 38 and the slot 42 are at opposite sides of the recess 26 and contiguous therewith.

A feature of this invention is construction that permits convertibility of a carrier to uses other than that of hauling the containers disclosed herein by placing the top surface of the platform 11 in a flat, unobstructed condition by inversion of the fixtures 8. To achieve this end, the platform 11 has been recessed below the top surface 14 to the level of surface 45 to permit complete disposition of the flange 15 below surface 14.

The opening 46 within the platform is contiguous with the recess 24 of the fixture 8 and extends from its bottom surface 45 to the undersurface 47 of the platform. The opening 46 is of such contour and size as to receive the stud 18 including its tapered section 22, as shown in FIGS. 7 and 8.

In the inverted position of fixture 8, the handle of the key will dangle if not secured and the key and supporting areas therefor will be subject to wear. Hence, a small bracket 51 supporting the spring clamp 52 similar to clamp 35 is mounted on the undersurface 47 adjacent to the slot 31. At the inverted position of the fixture 8, the handle 32 is secured therein, as shown in FIGS. 7 and 8.

To secure fixture 8 to the platform 11 as disclosed herein, the flange 15 is provided with holes 54 flared at both ends to receive the heads of the bolts 10. The holes 54 are arranged symmetrically with respect to a vertical plane containing the keyway axis to place the holes of the flange in proper registry with the symmetrically arranged holes in the platform regardless of the orientation of the fixture 8.

The member 5 has additional apertures 56 and 57 provided for uses not within the purview of this invention and not utilized thereby.

The cargo tie-down apparatus described above is useful in highway, railway, ship deck, and airplane cargo floors to secure and maintain containers in place during transit. This apparatus is intended to provide flexibility in the use of the carriers utilized in this invention by invertibility of the anchor fixtures; safety, such as prevention of cargo shifting, in the use of the flat-bed carriers; attachment of the anchor fixture and key together on the carrier for instant availability; and the facility of parts of the apparatus, such as the key handle and the entire anchor fixture, to be stored in retracted or concealed positions.

The terms and expressions which have been employed are used as terms of description and not of limitation and there is no intention of excluding such equivalents as fall within the purview of the claims.

What is claimed is:

1. In combination: a lower corner member for a cargo container comprising walls defining an undersurface and a recess extending upwardly therefrom, and a pair of opposing walls having apertures disposed along a horizontal axis extending through said recess, one of said apertures extending downwardly as a slot in one of said walls to divide its lower extremity, the other aperture having a continuous periphery; an anchor member having a base and a stud projecting above the base adapted for extension into said recess with the base engaging said undersurface; the stud having a keyway extending therethrough along an axis and, when positioned in the container member, coinciding generally with said axis of the member; said keyway being eccentrically enlarged to define a radially offset region along an intermediate portion of its length, and a groove extending lengthwise of the keyway from said region to the terminus of the keyway at one side of the stud; the angular extent of the groove about the axis of the keyway being substantially less than that of said region; a key comprising a handle and a pin connected in end-to-end pivotal relation with respect to an axis perpendicular to the length of the pin; the pin having a laterally projecting lug traversable through said groove and when disposed with the lug in said region having its end portion protruding into said corner member aperture of continuous periphery; said key being movable to traverse the lug lengthwise of the keyway toward said one side of the stud to retract said protruding pin portion within the stud; said handle, with said lug positioned in said offset region, folding relatively to the pin into said slot and a recessed porton of said base.

2. The combination of claim 1 wherein the clearance of the sides of said slot with the key are equal to or greater than the clearance of the stud with sides of said member-recess in a horizontal direction transversely of the keyway axis.

3. The combination of claim 1 wherein: said base comprises a flange extending horizontally outwardly from opposite sides of the stud to provide coextensive upward facing and downward facing bearing surfaces on opposite sides of the flange; and the combination further comprises a cargo container supporting platform having a shallow recess for receiving the flange, an opening extending through the support from a central portion of the recess adapted to receive said stud when the anchor member occupies an inverted position with said flange in said platform recess.

4. Tie-down apparatus for cargo comprising: an anchor member having a base adapted to be attached to a carrier platform, and a stud projecting above the base; said base comprising a flange extending horizontally outwardly from opposite sides of the stud to provide co-extending upward facing and downward facing bearing surfaces; the stud, having a keyway extending therethrough along a generally horizontal axis; the flange having, at one side of the stud, a slot generally parallel with the length of the keyway; a key comprising a handle having a shank portion and a grip, and a pin extending through said keyway connected to the shank portion in end-to-end pivotal relationship with respect to a folding axis perpendicular to the length of the pin; said pin being rotatable to a locking position disposing said handle for folding about said folding axis downwardly and inwardly into said slot; said pin and the stud having detent means cooperating at said locking position to lock the pin from endwise movement in said keyway; said shank having a length greater than the vertical distance between the keyway axis and said downwardly facing surface of the flange to extend through said slot and dispose said grip underneath the flange when the handle is received in the slot; the pin having a length greater than said keyway disposing the end portion thereof opposite that connected with the handle outwardly of said stud at said locking position; and the surfaces of the base forming the sides of said slot being spaced to restrict the key from such angular movement of the handle about said horizontal axis as to disengage the detent means when the shank is received in said slot.

5. The tie down apparatus of claim 4 wherein: the detent means comprises said stud having an eccentric enlargement of said keyway defining a radially offset region along an intermediate portion of its length and a groove extending lengthwise of the keyway from said region to the terminus thereof at the side of the stud adjacent said folding axis; the angular extent of the groove about said axis being substantially less than that of said region; and said pin having a laterally projecting lug traversable through said groove and when disposed with the lug in said region having its end portion protruding beyond the side opposite the said first-named side; said key being movable to traverse the lug lengthwise of the keyway toward said first-named side to retract said protruding end portion within the stud.

6. Tie-down apparatus for a cargo container comprising: an anchor member having a base flange and a stud projecting during tie-down operation above the flange; said flange extending horizontally outwardly from opposite sides of the stud to provide co-extending upward facing and downward facing bearing surfaces; a carrier platform having a shallow recess in its upper surface for receiving the flange; the stud having a keyway extending therethrough in spaced relation with the upper surface of the platform along a generally horizontal axis; the flange and the platform having surfaces forming a slot in each in vertical registry with the other and extending parallel to said axis inwardly from respective peripheries into general vertical alignment with the side of the stud apertured by the keyway; a key comprising a handle having a shank portion and a grip, and a pin extending through the keyway connected to the shank portion in end-to-end pivotal relationship with respect to a folding axis perpendicular to the length of the pin; said pin being rotatable to a locking position disposing said handle for folding about said folding axis downwardly and inwardly into said slot when the stud projects upward; said pin and the stud having detent means cooperating at said locking position to lock the pin from endwise movement in said keyway; said handle folding, at said locking position, into said slots; said shank having a length greater than the vertical distance between the keyway axis and an undersurface of the platform opposite said recess to dispose said grip underneath the platform when said handle is received in the slots; the pin having a length disposing the end portion thereof opposite that connecting with the handle outwardly of said stud at said locking position; and the surfaces of the flange and the platform forming the sides of respective slots being spaced to restrict the key from such angular movement of the handle about said horizontal axis as to disengage the detent means when the shank is received in the slots.

7. The tie-down apparatus of claim 6 wherein: said surfaces of the recess and the flange are generally co-extensive and symmetrical with respect to a vertical plane containing the pin axis; said plane extends centrally lengthwise of said slots; and the platform has an opening contiguous with and extending centrally downwardly from said recess for receiving said stud of the anchor member when occupying an inverted position disposing the flange within said recess.

References Cited in the file of this patent

UNITED STATES PATENTS

| | | |
|---|---|---|
| 1,408,413 | Smith | Feb. 28, 1922 |
| 1,408,414 | Smith | Feb. 28, 1922 |
| 1,628,473 | Pokorney | May 10, 1927 |
| 2,103,751 | Kellett | Dec. 28, 1937 |
| 2,128,364 | Kellett | Aug. 20, 1938 |
| 2,758,861 | Molloy | Aug. 14, 1956 |
| 3,011,749 | Kozak | Dec. 5, 1961 |